Patented Oct. 26, 1937

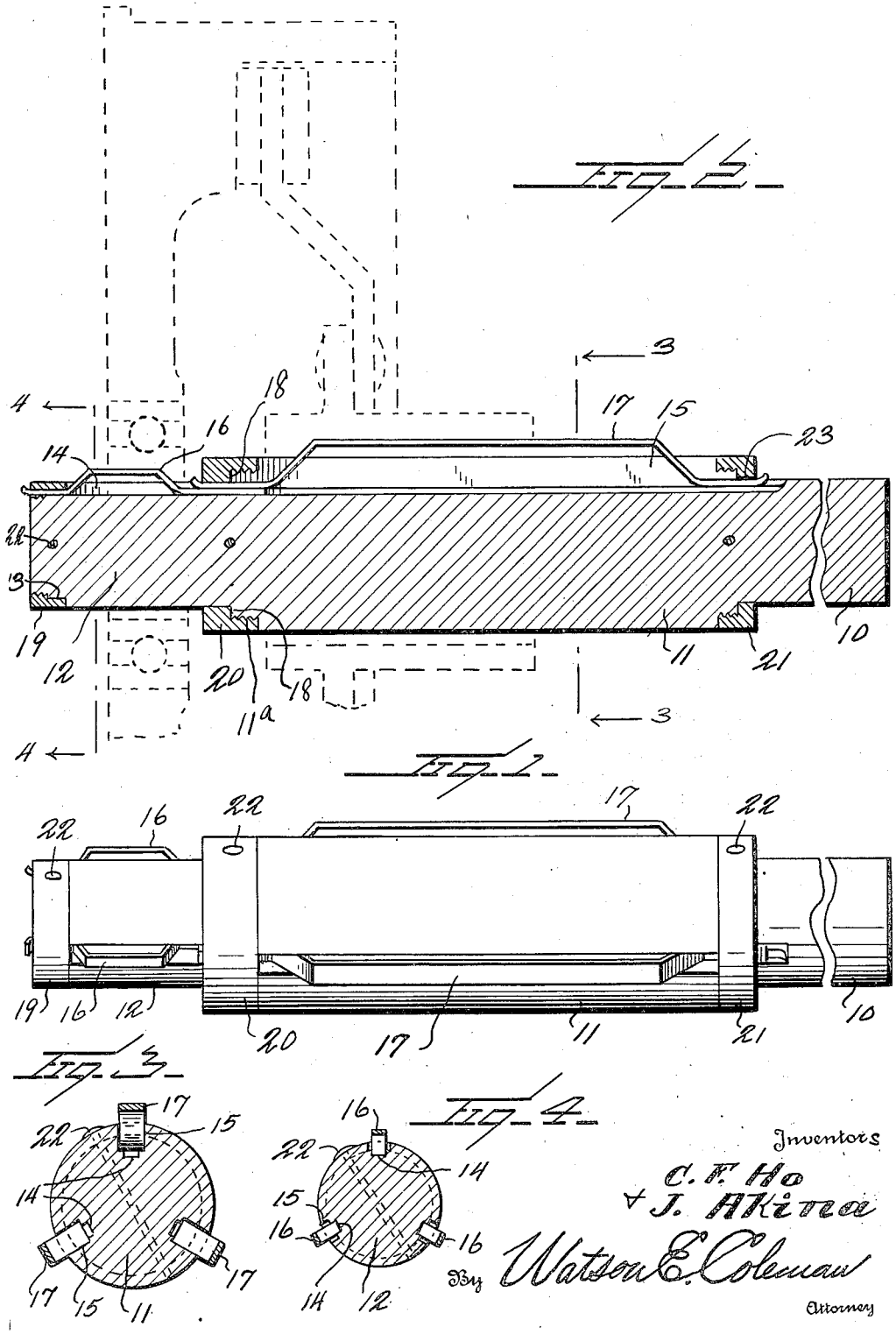

2,097,372

UNITED STATES PATENT OFFICE 2,097,372

CLUTCH DISK CENTERING AND PILOT TOOL

Charles F. Ho and James Akina, Honolulu, Territory of Hawaii

Application March 11, 1937, Serial No. 130,418

5 Claims. (Cl. 29—89)

This invention relates to tools used in repairing and reassembling automobile parts and particularly to a tool used when a clutch is to be relined.

When relining a clutch, the transmission casing or assembly has to be removed. The clutch pressure plate is then removed, and the clutch plate itself taken out. In reassembling the parts, the clutch plate must be put back in place and this plate must be properly centered within the clutch before the pressure plate is bolted on. In use, the clutch plate is centered by the clutch shaft or pilot shaft attached to the transmission casing, the end of which is supported in a pilot bearing.

The object of our invention is to provide a clutch plate centering tool or dummy pilot shaft which, when the pilot shaft is removed, takes its place. When it is desired to reassemble the parts, the clutch plate is put back in place with the tool inserted within the pilot bearing, the pressure plate is bolted on and the tool removed, as will be later more fully explained.

Our invention is illustrated in the accompanying drawing wherein:

Figure 1 is a perspective view of our improved tool.

Figure 2 is a longitudinal sectional view thereof and showing the fly wheel and clutch in dotted lines.

Figure 3 is a section on the line 3—3 of Figure 2.

Figure 4 is a section on the line 4—4 of Figure 2.

Referring to this drawing, 10 designates the handle of the tool and integral with the handle and extending axially therefrom is a diametrically enlarged portion 11 which we will hereinafter term the barrel, and beyond this barrel 11 is a relatively short portion 12 having approximately the same diameter as the handle, and thus is reduced in diameter relative to the barrel 11. The extremity of this portion 12 is further reduced, as at 13. The portions 10, 11, 12 and 13 are of one piece of steel or other suitable material.

Extending longitudinally of the portion 12 are a plurality of equi-distantly spaced relatively narrow and relatively shallow grooves 14. Extending longitudinally of the barrel 11 are equi-distantly spaced grooves 15. These are slightly wider than grooves 14 but extend out to the peripheral face of the portion 11 and are, therefore, deeper than the grooves 14. The extremities of the barrel are reduced in diameter, as at 11a. Adapted to be disposed in grooves 14 are the outwardly bowed leaf springs 16, the extremities of which bear flat against the floor of the grooves. Disposed in the grooves 15 of the barrel are the outwardly bowed relatively longer leaf springs 17. The ends of the springs 17 which adjoin the springs 16 extend over and rest against the outer faces of the near ends of springs 16. These conjoined end portions or heels of the springs are disposed outward of the shoulder 18, which defines the inner end of the portion 12. The outer ends of the springs 16 extend over the portion 13. A collar 19 fits over the reduced portion 13 and tightly over the ends of the springs 16. A like but larger collar 20 engages over the reduced portion 11a and over the shoulder 18 and bears against the conjoined overlapping ends of both springs 16 and 17. The opposite ends of spring 17 are held in place by a collar 21. Each of these collars 19, 20 and 21 is held in place by a transversely extending removable pin 22.

The springs 16 are designed to center the portion 12 within the pilot bearing for the fly wheel. The springs 17 are designed to center this tool within the clutch plate. In using the tool, after the transmission is removed and the clutch or pilot shaft removed and before the clutch plate is removed, the tool is inserted through the clutch plate with its portion 13 extending into the pilot bearing. The clutch plate is then removed as usual and the relining job attended to. In reassembling, the clutch plate is required to be put back in place and in order to do so, this clutch plate must be properly centered before the pressure plate is bolted on. This proper centering of the clutch plate is secured by inserting the reduced end 12 of the tool which projects beyond the clutch plate into the pilot bearing. The pressure plate is then put in place and bolted on and the tool removed. By engaging the transmission gears in high and turning the same slowly on the driving shaft flange, the spline on the pilot shaft of the transmission will naturally fall into the grooves in the clutch plate, thus saving the mechanic lots of time and guess-work.

The leaf springs 17 have sufficient normal expansion to centralize any clutch plate of the modern type. The centralizing tool is merely pushed into the bore and the cushioning springs will yield as may be required. The extremities of the main spring 17 are slightly turned upward in a curve so as to prevent sticking or gouging. It will be noticed also that the heels of these springs are slightly rounded so as to permit better movement of the spring when compressed. It will also be seen that the angled portions at the ends of the spring 17 are acutely angled with relation to the longitudinal plane of the spring.

The collars 19, 20 and 21 are slotted on their inside faces as shown in Figure 2, so that the springs may have longitudinal movement. These slots are designated 23.

What is claimed is:—

1. A tool for use as a dummy pilot shaft for supporting and centering a clutch plate within the fly wheel of an automobile, comprising a stock formed to provide a handle and a diametrically enlarged and longitudinally extended barrel constituting an axial continuation of the handle, the extremity of the barrel being reduced to fit within the pilot bearing for the fly wheel, a plurality of equi-distant outwardly bowed leaf springs on the reduced end portion of the dummy shaft, and a plurality of equi-distantly spaced outwardly bowed relatively long leaf springs having a middle portion extending parallel to the longitudinal axis of the barrel, the spring being carried on the barrel.

2. A tool for use as a dummy pilot shaft for supporting and centering a clutch plate within the fly wheel of an automobile, comprising a stock formed to provide a handle and a diametrically enlarged and longitudinally extending barrel constituting an axial continuation of the handle, the extremity of the barrel being reduced to form a portion adapted to fit within the pilot bearing for the fly wheel, the reduced end of the stock having a plurality of equi-distantly disposed longitudinal grooves and the barrel having a plurality of longitudinal grooves, outwardly bowed leaf springs disposed in said grooves, and means at the ends of the barrel and at the outer end of the reduced portion engaging over the ends of said springs.

3. A tool for use as a dummy pilot shaft for supporting and centering a clutch plate within the fly wheel of an automobile, comprising a stock formed to provide a handle and a diametrically enlarged and longitudinally extending barrel constituting an axial continuation of the handle, the extremity of the barrel being reduced to form a portion adapted to fit within the pilot bearing for the fly wheel, the reduced end of the stock having a plurality of equi-distantly disposed longitudinal grooves and the barrel having a plurality of longitudinal grooves, outwardly bowed leaf springs disposed in said grooves, detachable collars engaging over the ends of the barrel, and a detachable collar engaging over the end of the reduced portion, said collars holding the springs in place, the intermediate collar on the barrel engaging the adjacent ends of both the barrel springs and the springs on the reduced portion.

4. A tool for use as a dummy pilot shaft for supporting the centering and clutch plate within the fly wheel of an automobile, comprising a stock formed to provide a handle and a diametrically enlarged and longitudinally extending barrel constituting an axial continuation of the handle, the extremity of the barrel being reduced to fit within the pilot bearing for the fly wheel, the reduced end of the stock having a plurality of equi-distantly disposed relatively narrow and relatively shallow grooves extending longitudinally thereof, the barrel having a like number of equi-distantly disposed longitudinally extending grooves, said grooves being wider than the first named grooves but opening thereinto, outwardly bowed leaf springs disposed in the grooves of the barrel, outwardly bowed leaf springs disposed within the grooves of the reduced portion, the inner ends of the springs overlapping each other, a detachable collar fitting over the extremity of the reduced portion and clamping the outer ends of the springs thereof in place, a detachable collar engaging over that extremity of the barrel adjacent the handle and clamping the like ends of the barrel springs in place, and an intermediate detachable collar engaging over the barrel and the reduced portion and engaging over the overlapping ends of the springs of the barrel and reduced portion and clamping them in place.

5. A tool for use as a dummy pilot shaft for supporting and centering a clutch plate within the fly wheel of an automobile, comprising a stock formed to provide a handle and a longitudinally extending cylindrical barrel constituting an axial continuation of the handle, the extremity of the barrel being formed to fit within the pilot bearing for the fly wheel, a plurality of equidistant outwardly bowed leaf springs on that portion of the barrel adapted to fit within the pilot bearing, and a plurality of equi-distantly spaced outwardly bowed relatively long leaf springs carried on the barrel, each spring having a middle portion extending parallel to the longitudinal axis of the barrel.

CHARLES F. HO.
JAMES AKINA.